UNITED STATES PATENT OFFICE.

JOHN J. CROOKE, OF SOUTHFIELD, NEW YORK.

IMPROVEMENT IN THE MANUFACTURE OF TIN-FOIL.

Specification forming part of Letters Patent No. 195,490, dated September 25, 1877; application filed May 24, 1877.

*To all whom it may concern:*

Be it known that I, JOHN JEREMIAH CROOKE, of the town of Southfield, county of Richmond and State of New York, have made an invention or discovery of a new and useful Manufacture of Compound Tin-Foil, and of certain intermediate products produced in making the same, also of an improvement in the process of manufacturing metallic foil; and I declare that the following is a full, clear, and exact description and specification of the said invention.

Tin-foil has been made with a core or layer of lead plated or faced on each side with a thinner layer of commercially pure tin, the whole welded together or united otherwise, so as to constitute a solid compound sheet, by which I mean a sheet composed of parts which do not slip upon each other or separate into laminæ when bent. Such compound tin-foil has been made by applying a sheet of commercially pure tin to both sides of a slab or heavier sheet of lead, and then passing the whole repeatedly between the rollers of a foil rolling-mill, the effect of which is first to weld the layers of tin and lead together, so as to unite them superficially, and then to reduce the compound slab to the required thinness for use.

In manufacturing tin-foil upon this system, the lead core, being of a softer material than the tin of which the facings are composed, tends to extend or roll down in thickness more readily than such tin facings, and during the first passage between the rollers the lead elongates or creeps along the tin, the portion immediately in advance of the rolls moving backward along the tin in a species of wave. The same tendency to creep and move in a wave while being rolled appears to exist in the lead after the layers of lead and tin have been united superficially, although the tendency is then controlled more or less by the tin facings, for I have found that the layers of tin and lead are of unequal thickness at different parts of the compound sheet, the surface of the tin which is welded or connected with the lead being pitted or wavy, and the lead-core extending into these pits or depressions closer to the exterior surface of the sheet than at other places.

The difference in the rolling capacities of the two metals, (lead and tin,) the constant tendency of the lead to creep, and the irregularities of the welded or united surface, appear to constitute practical obstructions to the reduction of the thickness of the tin facing below a certain proportion, in practice being usually about one-eighth of that of the lead core; and I have found by experience that if the exterior tin plating be reduced materially below this proportion the tin appears to be ruptured in the process of rolling, and the lead makes its appearance in streaks at the surface of the foil.

Tin is a more costly metal than lead; hence the cost of the materials required to make the compound tin-foil depends upon the relative quantities of lead and tin required for the purpose, and the smaller the proportion of tin that can be used relatively to the lead the lower will be the cost of the material of the foil.

My invention is based upon the discovery that an alloy of lead and tin will work in the rolling-mill practically like commercially pure tin; also, that this alloy may be united, welded, or connected superficially with a plating of commercially pure tin, and that the compound slab or sheet of tin and alloy thus formed will work in the rolling-mill practically like commercially pure tin; also, that the said alloy of lead and tin may be united, welded, or connected superficially with a slab of lead, and that the compound slab thus produced will work in the rolling-mill practically as a compound slab of lead and commercially pure tin. Hence, in the manufacture of compound tin-foil, having a surface of commercially pure tin, I have succeeded in dispensing with a large portion of the tin heretofore used, and in employing in its place a low-priced alloy of lead and tin, retaining only a thin facing of commercially pure tin at the surface of the finished article. My new manufacture of compound tin-foil, therefore, consists substantially of three or more united layers of lead, the alloy of lead and tin, and tin, in which compound the said lead-tin alloy is intercalated between the lead and tin and the layers are united superficially, so as to constitute a solid compound sheet. I have also produced a low grade of foil, consisting of two or more united layers of lead and the lead-tin alloy united superficially, so as to constitute a compound sheet without a surface of commercially pure tin.

My improvement in the art consists of the process by which the above article of compound tin-foil may be produced. As, however, substantially the same article may be produced by other processes or by variations of my process, I do not restrict the article of manufacture to the process which I have employed to produce it.

In order that my invention may be fully understood, I will proceed to describe the mode in which I have produced my manufacture with success. An ingot of an alloy of lead and tin, containing, generally, about eight per cent. of tin, is cast on edge in an iron mold, the ingot being seven-eighths of an inch thick and eighteen inches long, and being of a blunt wedge form or rounded at its lower end. The breadth of the ingot may be such as is suitable for the rolling-mill in which the ingot is to be rolled down, a good breadth for general purposes being about six inches. This lead-tin ingot is rolled down by passing it endwise, point foremost, between the rolls of the rolling-mill, to a thickness of three-eighths of an inch, when the slab will be about three feet two inches long. A rolled sheet of commercially pure tin is laid upon one side of the said slab of lead-tin alloy such sheet being of the thickness of No. 21 wire gage, and of the same superficial dimensions as the slab of alloy. The sheet and the slab of alloy are then passed simultaneously endwise between the rolls of the rolling-mill. The first passage causes the tin sheet and the slab of alloy to unite, and the rolls may be set to reduce the thickness at this passage to one-quarter of an inch. The compound tin-plated slab of lead-tin alloy is passed twice more through the rolls, which are set to reduce it successively to a thickness of one-eighth of an inch and of one-sixteenth of an inch, or No. 13 wire gage. The compound thin tin-plated alloy sheet thus produced is fifteen feet long, and this sheet should be cut crosswise into two short sheets for further use, each of the short sheets of tin-plated alloy being seven feet six inches long, and being composed of a layer of tin and a layer of lead-tin alloy united into a solid compound sheet.

An ingot of lead is cast of the same dimensions as the ingot of lead-tin alloy first above mentioned, and is reduced by rolling to a slab of a thickness of three-eighths of an inch, when it will be about three feet two inches long. One of the above-mentioned short sheets of tin-plated alloy is doubled lengthwise, with the tin face outward, and is applied to the slab of lead, so as to cover the same, with the rounded end of the lead slab in close contact with the fold of the doubled sheet, the ends of which will project beyond the end of the lead slab. The inclosed slab is then rolled point foremost. The rolls at the first passage may be set to reduce the thickness to three-eighths of an inch. In this passage the lead core creeps lengthwise, so that it extends to the end of the cover of tin-plated alloy, and the effect of the rolling is to unite the whole into a solid compound slab, suitable for being reduced to foil by successive rolling. This slab may be reduced by a second passage between the rolls to a thickness of No. 12 wire gage, and by a third passage to a thickness of No. 19 wire gage. At this stage of the rolling it is expedient to trim the edges of the compound sheet, after which it may be reduced to foil of the required thickness by subsequent rollings.

The foil thus produced is composed of five layers of material solidly united, the central layer or core being lead, the next layer at each side of the core being of lead-tin alloy, and the outermost layer or facing at each side being tin.

This article may be used for the same purpose as the compound tin-faced tin-foil now in the market; but I find that the former is much stronger than the latter foil, while the cost of the materials required for its production is greatly reduced, because of the employment of the lead-tin alloy in place of an equal thickness of tin, and the consequent great reduction in the weight of tin contained in the foil.

On the other hand, inasmuch as the tin facing, although thin, is sustained during the rolling by the backing of alloy, which is harder than lead, the tin is prevented, in whole or in part, from indenting the backing in ridges or spots, and is, in consequence, distributed throughout the surface of the foil in a very even manner.

If foil having a tin surface at only one side is required, the lead slab should be covered at one side only with a sheet of the tin-plated lead-tin alloy, and in that case will be composed of three layers of material united into a solid compound sheet.

In either the single-faced or double-faced foil above described the layer of lead is united with the adjacent layer or layers of the lead-tin alloy, and the two are combined into a solid sheet; and the fact of the union of the layers of lead and lead-tin alloy, and of the capacity of the resulting compound slab or sheet to be reduced by rolling, may be taken advantage of to produce a low grade of metallic foil having a brighter surface than lead.

Thus a slab of lead may be covered at one or both sides, as required, with a sheet of the lead-tin alloy, and the covered slab may be then rolled, trimmed, and reduced to foil. In some cases it may be expedient to plate the lead at one side only with the tin-plated lead-tin alloy, and at the other side with a sheet of commercially pure tin, and then to reduce this compound article to foil. The foil in this case would be faced at each side with tin, but the thickness of tin at one side would be greater than at the other.

It will also be perceived that, inasmuch as the layer of tin and the layer of lead-tin alloy produced in the process of manufacture above described will unite, and the compound has the capacity of being reduced by rolling without the separation of its component layers, the tin-faced lead-tin alloy may be rolled down into a hard metallic foil. Thus the slab of the alloy plated on one side with tin, as above described, or a slab of the alloy plated on both sides with tin, may be rolled down into foil which will consist of a layer of lead-tin alloy and of one or two layers of tin united in a solid compound sheet, and presenting a tin face.

Stiff foil may also be produced by using a core slab of the lead-tin alloy, a layer of lead at one or both its sides, and a layer of tin at one or both exterior faces of the other layers, the whole being united and reduced substantially as previously described.

If required, tin-faced foil may be produced having a greater number of component layers of materials than five, the sheets or slabs and sheets of the materials which the manufacturer elects to use being arranged in the order required before they are united together.

If deemed expedient, the process of manufacture may be varied. Thus, instead of combining the commercially pure tin facing first with the lead-tin alloy, and then combining the compound sheet or slab with a lead core or body, the lead-tin alloy may be first combined superficially with the lead core or body by rolling a sheet (either double or single) of the former in connection with the latter; and then the compound sheet or slab of lead-tin alloy and lead may be covered at one or both of its sides, as required, with a sheet of commercially pure tin; and the whole may be united superficially by passing them between the rolls of the rolling-mill, after which the compound slab or sheet may be reduced to foil, substantially as before described.

Although my experience leads me to believe that rolling is the most economical means of uniting the layers of materials superficially into a solid compound slab or sheet, yet my manufacture is not restricted to this process. Thus the superficial union of a layer or layers of the lead-tin alloy and a layer or layers of the other materials may be effected by other means than by the operation of rolling them in contact—as, for example, by the use of a very fusible solder; or the lead-tin alloy may be superficially united with a thin layer of tin by depositing tin upon the former by the galvanoplating process. In either case, after the superficial union of the layers of the materials has been effected, the compound slab or sheet is rolled in order to obtain foil of the usual thickness and smoothness of surface found in the market.

It is not deemed necessary to give minute directions as to the rolling and trimming of the materials, because the same precautions may be used in producing my new manufacture that are used when producing compound tin-faced foil having a lead body and commercially pure tin face; and these are well-known, and have been described in previous publications—as, for example, in the Patent No. 32,355, granted me the 21st day of May, A. D. 1861. The rolling-mill used may be that heretofore used in the manufacture of tin-foil, care being taken that the rolls are of the same diameter.

The proportion of tin in the lead-tin alloy need not necessarily be restricted to eight per cent., but may be varied as found expedient, good results being obtained with alloys containing from five to ten per cent. of tin. So, also, the lead core or body need not necessarily be absolutely free from tin. As, however, the effect of the presence of tin in the material of the core or body is both to increase the cost and to reduce the flexibility of the foil, I do not recommend the use of any tin in such core or body.

I claim as my invention—

1. The new manufacture of compound tin-foil, substantially as hereinbefore described, composed of a layer of lead, a layer of lead-tin alloy, and a layer of tin, united superficially in a solid sheet.

2. The improvement in the art of making foil, consisting, substantially as hereinbefore set forth, in uniting superficially a layer of tin with a layer of lead-tin alloy, and in uniting superficially a layer of the tin-plated alloy thereby produced with a layer of lead.

Witness my hand this 14th day of May, A. D. 1877.

JOHN JEREMIAH CROOKE.

Witnesses:
HENRY S. CROOKE,
WALTER BETTS.